United States Patent [19]

Ristic et al.

[11] Patent Number: 5,291,607
[45] Date of Patent: Mar. 1, 1994

[54] MICROPROCESSOR HAVING ENVIRONMENTAL SENSING CAPABILITY

[75] Inventors: Ljubisa Ristic, Phoenix; William C. Dunn; Bertrand F. Cambou, both of Mesa; Lewis E. Terry, Phoenix; Raymond M. Roop, Scottsdale, all of Ariz.

[73] Assignee: Motorola, Inc., Schamburg, Ill.

[21] Appl. No.: 965,549

[22] Filed: Oct. 23, 1992

Related U.S. Application Data

[63] Continuation of Ser. No. 578,031, Sep. 5, 1990, abandoned.

[51] Int. Cl.$^5$ .................. G06F 15/20; G01D 5/00
[52] U.S. Cl. ..................... 395/750; 307/310; 307/308; 361/103; 364/232.8; 364/273.5; 364/DIG. 1; 364/488
[58] Field of Search ............. 395/750, 575, 775; 307/310, 308; 340/643, 825.06; 364/506, 488; 361/103

[56] References Cited

U.S. PATENT DOCUMENTS

| | | | |
|---|---|---|---|
| 3,555,251 | 1/1971 | Shavit | 235/150.1 |
| 3,906,310 | 9/1975 | Esashika | 317/33 VR |
| 4,077,030 | 2/1978 | Helava | 340/183 |
| 4,100,563 | 7/1978 | Clark | 357/27 |
| 4,103,337 | 7/1978 | Whiteside | 364/900 |
| 4,317,126 | 2/1982 | Gragg, Jr. | 357/26 |
| 4,425,628 | 1/1984 | Bedard et al. | 364/900 |
| 4,441,072 | 4/1984 | Rahman | 323/368 |
| 4,463,274 | 7/1984 | Swartz | 307/491 |
| 4,465,075 | 8/1984 | Swartz | 128/672 |
| 4,531,198 | 7/1985 | Matsuda | 364/900 |
| 4,556,955 | 12/1985 | Wright et al. | 364/133 |
| 4,631,662 | 12/1986 | Stutler et al. | 364/200 |
| 4,682,264 | 7/1987 | Demeyer | 361/96 |
| 4,685,614 | 8/1987 | Levine | 236/78 D |
| 4,736,337 | 4/1988 | Baba | 364/900 |
| 4,810,022 | 3/1989 | Takagi et al. | 296/180.5 |
| 4,823,280 | 4/1989 | Mailandt et al. | 364/514 |
| 4,876,647 | 10/1989 | Gardner et al. | 364/420 |
| 4,924,111 | 5/1990 | Anderson et al. | 307/270 |
| 4,969,062 | 11/1990 | Barylak et al. | 361/42 |
| 5,084,868 | 1/1992 | Kelly et al. | 370/69.1 |
| 5,107,456 | 4/1992 | Schuur et al. | 395/325 |

Primary Examiner—Gopal C. Ray
Attorney, Agent, or Firm—Joe E. Barbee

[57] ABSTRACT

A microprocessor having a monolithically integrated environmental sensor is provided. The microprocessor is shielded from an environmental signal by isolation which is specific to the type of sensor used, thereby allowing the sensor to be exposed to the environmental signal. Optionally, high current drive circuitry is integrated with the microprocessor-sensor circuit to provide a monolithic device which allows control of power loads based in part on output from an environmental sensing device.

9 Claims, 3 Drawing Sheets

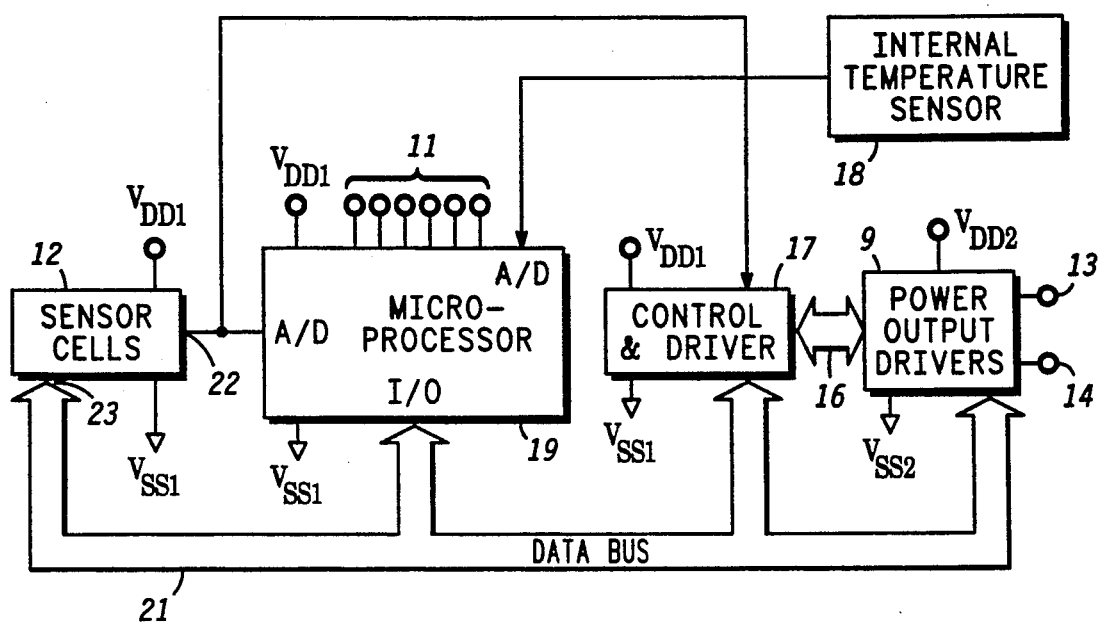
FIG. 1
FIG. 2
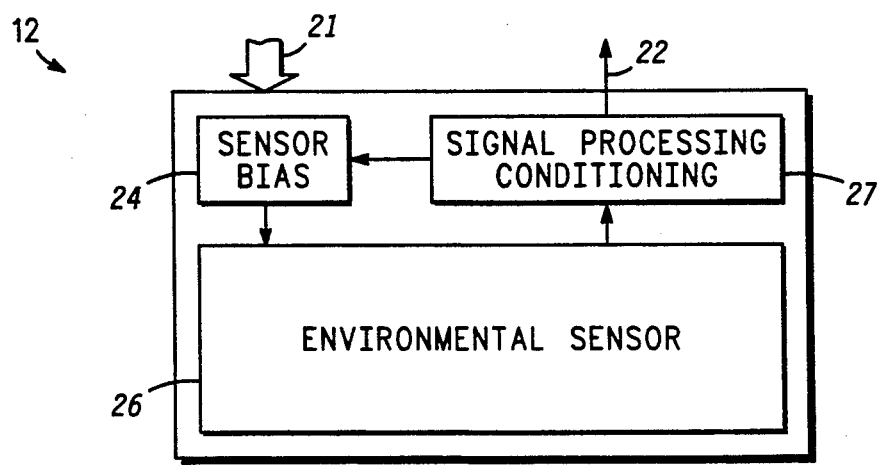

MICROPROCESSOR HAVING ENVIRONMENTAL SENSING CAPABILITY

This application is a continuation of prior application Ser. No. 07/578,031, filed Sep. 5, 1990, now abandoned.

BACKGROUND OF THE INVENTION

This invention relates, in general, to microprocessors and sensors and more particularly, to a microprocessor having an integrated environmental sensor which is process compatible with microprocessor technology.

A wide variety of solid state sensor devices are available which produce electrical output in response to environmental conditions. The sensors can be broken generally into several basic categories: mechanical sensors, temperature sensors, magnetic field sensors, optical sensors, and chemical sensors. Sensor devices are often identified by a particular application such as biomedical sensor and gas sensors, but these generally fit into one or more of the basic categories.

Solid state sensors are generally analog devices, and as such their output is sensitive to a variety of ambient conditions. This property is advantageous in detecting an environmental condition, i.e. detecting pressure for a pressure sensor, but detrimental in that a pressure sensor is also sensitive to temperature, light, and package stress. These other sensitivities create noise signals in the output which must be filtered or compensated.

Recently, integrated sensors have become available with both passive and active compensation circuits built on the same chip as the sensor device. Examples of such devices in pressure sensors are found in U.S. Pat. No. 4,463,274 and U.S. Pat. No. 4,465,075 issued to Craig C. Swartz. Such devices are useful in providing some preconditioning to the sensor output before the output signal is passed to the other circuitry.

Another recent development is the increasing application of microprocessors (MPUs) and microcontrollers. Microprocessors have been used with sensor devices to process and control the sensor output. MPUs can be used to calibrate and compensate sensor output, as well as active filtering of sensor output. Microprocessors having high current drive are also known which can be used to control motors, compressors, pumps and the like.

In the past, sensors and MPUs have been physically located away from each other, and not manufactured on the same monolithic substrate. This is because sensors are exposed to the environment which is to be sensed while conventional wisdom dictates that the MPU be removed from this environment. The environment to which a sensor is exposed is often extremely harsh. Likewise, MPUs, especially when combined with power devices, create noise which affect sensor devices. In particular, heat generated by MPUs and power devices has led the industry away from mounting sensors near MPUs.

The physical separation of the MPU from the sensed environment created constraints which curbed sensor utility. Physical separation creates larger systems which are more obtrusive to the environment to be sensed, and which were too large to be located in many environments. Also, separation makes it necessary to either port the environmental signal to the sensor-microprocessor system or port an electrical signal from a discrete sensor to the microprocessor. Either of these options is particularly sensitive to noise, and reduces system performance.

Although MPUs and sensors are both solid state devices, their differences in construction and operation have led the semiconductor industry to shun their integration. Pressure sensors and accelerometers, for example, required delicate micro-machining and carefully controlled processing which has not been compatible with CMOS MPU devices. Micro-machining involves silicon etching which weakens silicon substrates and increases breakage during processing. CMOS MPUs, on the other hand, are complex devices which are too expensive to risk breakage. In the case of non-mechanical sensors, the MPU is adversely affected by exposure to the environmental signal such as light, a magnetic field, or chemical exposure. Until now, MPUs have not been designed to operate in these environments.

In operation, most sensors generate analog signals which have been difficult to process in digital microprocessors. Interface circuits used to couple the analog sensor signal to an MPU required additional semiconductor devices and further discouraged monolithic integration of sensors and microprocessors. The fact that MPU designers have little familiarity with sensor design and vice versa has also slowed progress and limited recognition of the need for integrated MPUs and sensors, and the particular problems associated with their integration.

Accordingly, it is an object of the present invention to provide a solid state sensor monolithically integrated with a microprocessor.

Another object of the present invention is to provide a means for isolating the microprocessor from an environmental signal to which the sensor is exposed.

A further object of the present invention is to provide a sensor having an integrated microprocessor wherein the sensor incorporates a similar process as the microprocessor.

A still further object of the present invention is to provide a high power output sensor device with integrated data processing capability that can drive a load.

SUMMARY OF THE INVENTION

These and other objects and advantages of the present invention are achieved by a microprocessor having a monolithically integrated environmental sensor. The microprocessor is shielded from an environmental signal by a means for isolation which is specific to the type of sensor used, thereby allowing the sensor to be exposed to the environmental signal. Optionally, high current drive circuitry is integrated with the microprocessor-sensor circuit to provide a monolithic device which allows control of power loads based in part on output from an environmental sensing device.

BRIEF DESCRIPTION OF THE DRAWINGS

FIG 1 is a block diagram of a microprocessor core integrated with a power output device and an environmental sensor;

FIG. 2 illustrates a detailed block diagram of a sensor cell shown in FIG. 1;

DETAILED DESCRIPTION OF THE DRAWINGS

Figure 3:
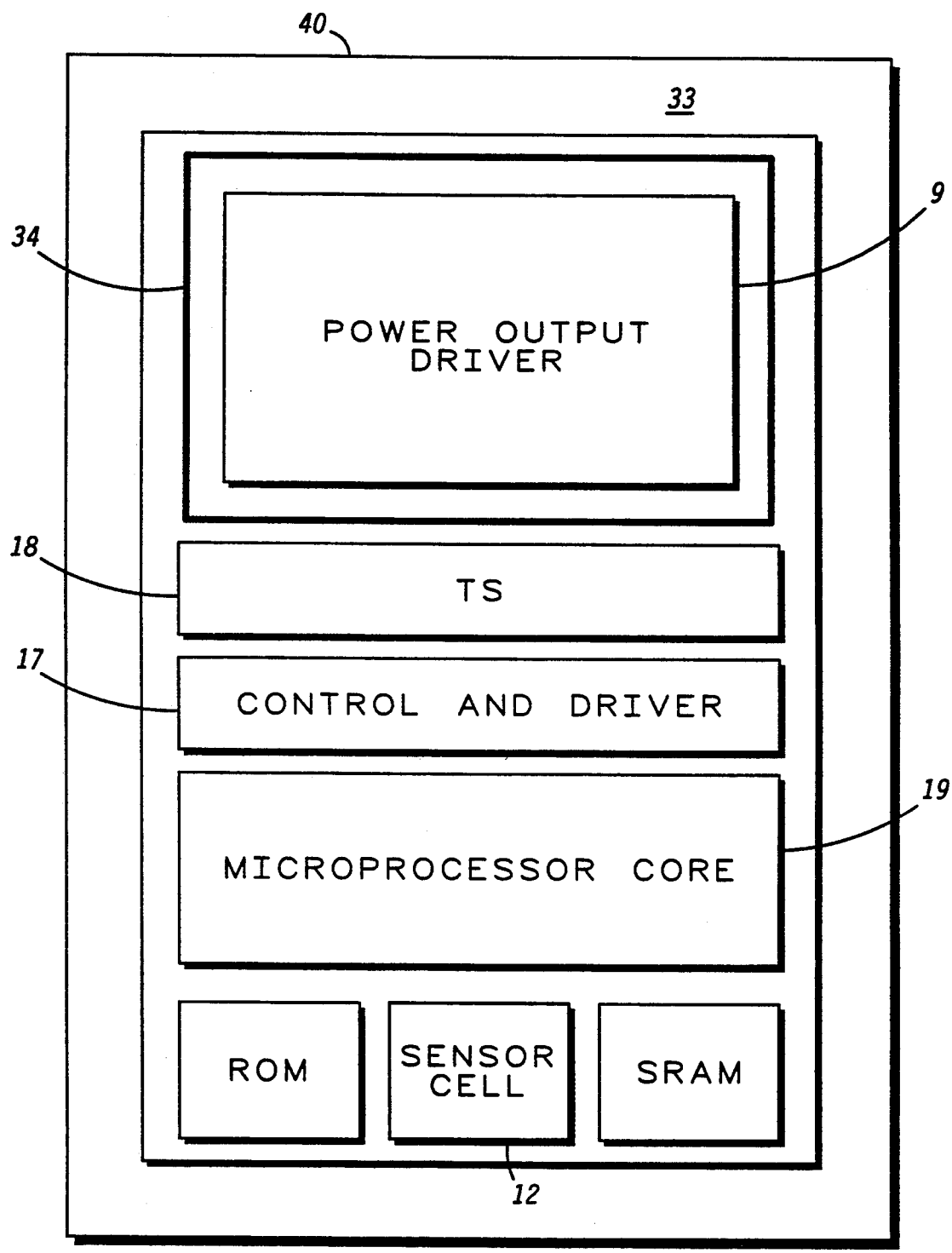
FIG. 3 illustrates a plan view of an integrated circuit layout of the present invention.

FIG. 1 illustrates a block diagram of a preferred embodiment integrated circuit having high current drive, means for data processing, and environmental sensor devices. Microprocessor core 19 is connected to a $V_{DD1}$ voltage supply and ground supply $V_{SS1}$. An internal data bus 21 connects an input/output (I/O) port of the microprocessor core to control and driver circuit 17, and sensor cell 12, and may optionally couple directly to power output drivers 9. Microprocessor core 19 is also connected to a plurality of input/output terminals 11 for receiving controlling instructions from an external source. Power output drivers 9 are connected to their own voltage supply $V_{DD2}$ and $V_{SS2}$ in order to minimize effects of noise due to large current spikes through power output drivers 9 onto the voltage supply level of microprocessor core 19 ($V_{DD1}$ and $V_{SS1}$). Power output drivers 9 are further connected to output terminals 13 and 14 for driving one or more loads. Sensor cells 12 produces at least one analog output 22 which is coupled to an analog to digital (A/D) input of an analog-to-digital converter (ADC) which is a portion of microprocessor core 19. Sensor cells 12 may also produce a digital frequency or binary output which would not require the ADC. Output 22 is also coupled to control and driver circuit 17.

For ease of illustration sensor cells 12 are illustrated as a single block in FIG. 1, but it is contemplated that several sensor cells 12 may be included on a single integrated circuit. Further, each of these sensor cells 12 may be of a different type, for example, one sensor cell 12 may be a pressure sensor and another may be a chemical sensor. Each sensor cell 12 is coupled as shown in FIG. 1, however. Likewise, a plurality of power output drivers 9 will often be desirable, each power output driver being coupled in the manner illustrated by a single block in FIG. 1.

Microprocessor core 19 typically contains at least a minimum amount of processing and control circuitry, including a central processing unit (CPU), CPU control circuit, arithmetic logic unit (ALU), internal control registers, pointers, and program counters. This minimum configuration provides a microprocessor core with the ability to control, monitor, and change control based on instruction and feedback signals. Microprocessor core 19 receives control and feedback signals from both the plurality of input/output terminals 11 and the internal data bus 21, as well as the ADC. Power output drivers 9 receive signals from microprocessor core 19 via control and driver circuit 17 and send back status information via data bus 21. Optionally, power output drivers 9 receive signals directly from microprocessor core 19. Significantly more processing power is added to microprocessor core 19 by inclusion of additional circuits including static random access memory (SRAM), read only memory (ROM), and timers (not shown).

It should be understood that although microprocessor core 19 as described hereinbefore is a preferable element of the present invention, other, more or less sophisticated circuits will perform in a similar manner and are intended to be encompassed within the scope of the present invention. Microprocessor core 19 functions to process data generated by sensor cells 12 and provided by inputs 11 and produces an output which controls power output drivers 9. Other means for data processing are known such as microcontroller circuits, reduced instruction set computer (RISC) circuits, fuzzy logic circuits, neural networks, and the like. In its simplest form, microprocessor core 19 may comprise a small amount of memory combined with logic devices which are dedicated to performing elementary logical operations for calibration of sensor cells 12 and control of power output drivers 9. All of these means for data processing differ primarily in scale of processing capability rather than fundamental principle of operation, and fall within the scope of microprocessor core 19 as used hereinafter.

Inclusion of SRAM and ROM allow microprocessor core 19 to operate independently from outside control since a control program may be stored in ROM and intermediate data may be stored in SRAM. In the present invention, an analog to digital converter (ADC) is used in microprocessor core 19 to convert an analog signal from both internal temperature sense circuit 18 and sensor cells 12 to a digital signal which may be processed by the CPU of microprocessor core 19. Still more versatility can be added by the inclusion of EPROM which allows the control program to be modified or a new control program to be stored for new applications. An example of a microprocessor core currently available for use as the intelligent circuit portion of the present invention is the Motorola 68HC11A4 microprocessor core.

Optionally, sensor cells 12 may include a digital input which is coupled via data bus 21. This allows functions which are performed internal to the sensor cells, such as sensor biasing and signal conditioning, to be controlled by microprocessor core 19. This control can be beneficial in calibration and adjustment.

Control and driver circuit 17 is coupled to power output driver 9 by a driver bus 16 and has two basic functions which include providing a driver voltage whose magnitude can be greater than the magnitude of the voltage level of the $V_{DD1}$ supply voltage, and providing necessary current drive to turn power output driver 9 on and off within a specified time interval. Current sensing and current limiting circuits may also be included in control and driver circuit 17, if they are not integrated as a portion of power output driver 9. If the magnitude of the $V_{DD1}$ power supply is greater than the magnitude of $V_{DD2}$ supply voltage, then the magnitude of the driver voltage may be equal to the $V_{DD1}$ supply voltage and still achieve maximum performance of power output driver 9.

In operation, microprocessor core 19 receives external commands from input/output ports 11. A typical example would be a command to perform self calibration. A control program stored in ROM will then direct microprocessor core 19 to provide the correct sequence of signals to internal data bus 21 which are then received by sensor cells 12. Sensor cells 12 could then be biased at a variety of biasing levels and the output recorded and compared against predetermined values stored in ROM. The calibration information thus obtained can be used to change bias conditions of sensor cells 12, or compensate for changes in the sensor due to temperature or other environmental operating conditions.

FIG. 2 illustrates a more detailed block diagram of a sensor cell 12 shown in FIG. 1. In its simplest form sensor cell 12 would include only environmental sensor 26 which would be biased from $V_{DD1}$ and provide an analog output on output 22. Environmental sensor 26 may be an electromechanical sensor such as a pressure sensor, or a nonmechanical sensor such as an optical sensor, Hall effect sensor, or chemical sensor. Although each of these sensors is diverse in function, it has been found that they can be manufactured using many processes which are shared by microprocessor devices, and therefore can be integrated into sensor cell 12 as set out in the present invention. Sensor cell 12 can also include a sensor bias circuit 24 which provides bias current and voltage to environmental sensor 26. Optional digital input to sensor cell 12 allows microprocessor core 19, shown in FIG. 1, to control sensor bias circuit 24.

Another optional element of sensor cell 12 is signal conditioning circuit 27. Signal conditioning circuit 27 can be active or passive signal conditioning and performs some temperature compensation as well as some amplification and output magnitude control. Signal conditioning circuit 27 provides an analog or digital output on output 22 and optionally provides an analog output to sensor bias 24 to allow some degree of feedback within sensor cell 12. This feedback loop, which is internal to sensor cell 12, is somewhat redundant in a microprocessor-sensor circuit, but redundancy becomes increasingly important in sensor applications. Sensor cell 12 is preferably biased by $V_{DD1}$ but a separate power supply may be provided for the sensor cell if desired.

Integrated circuits are available today which perform all of the functions of sensor cell 12. An example of a passive temperature compensated pressure sensor is the MPX2100 manufactured by Motorola, Inc. An example of an active compensation, including some signal amplification as well as temperature compensation, is the MPX5100 manufactured by Motorola, Inc. An example of a pressure sensor device which could be used for environmental sensor 26 is found in U.S Pat. No. 4,317,126 issued to John E. Gragg and assigned to the same assignee as the present invention. Examples of temperature compensation circuits which would be incorporated in sensor cell 12 include those shown in U.S. Pat. No. 4,463,274 and U.S. Pat. No. 4,465,075 issued to Craig Swartz and assigned to the same assignee as the present invention and incorporated herein by reference. An example of a non-mechanical magnetic sensor which could be incorporated in sensor cell 26 is found in U.S. Pat. 4,100,563 issued to Lowell Clark and assigned to the same assignee as the present invention and incorporated herein by reference.

FIG. 3 illustrates a layout of the integrated circuit shown in FIG. 1 wherein major circuit blocks are shown as they are located relative to each other on a monolithic circuit. FIG. 3 will be described in terms of a specific embodiment having a single sensor cell 12 and a single power output driver 9, but as set out hereinbefore a plurality of each of these components may actually be used. Because of large currents flowing through power output driver 9, it is advantageous to physically locate microprocessor core 19 at a maximum distance from power output driver 9. This is due to both junction temperature and excessive parasitic substrate currents. The reference numerals used to identify structures in FIG. 1 are used in FIG. 3 to identify the same structures.

Microprocessor core 19 is designed in a manner that places memory circuits at a maximum distance from power output driver 9. Sensor cell 12, which is also temperature sensitive, is placed a maximum distance from power output driver 9. The memory circuits, and especially the SRAM, are particularly sensitive to high temperature and high substrate currents. This further allows microprocessor core 19 to be arranged in the most suitable position. In other words, having the least heat sensitive circuits of the microprocessor core 19 towards power output driver 9 and more heat sensitive circuits near the memory blocks. The least heat sensitive circuits include the I/O bus, while more heat sensitive circuits vary depending on the configuration of the microprocessor core.

Sensor cell 12 is surrounded by a means for isolating 33 (shown in FIG. 4) which protects microprocessor core 19, control and driver 17, and power output driver 9 from an environmental signal which is to be sensed. For an electro-mechanical sensor the means for isolation may comprise nothing more than a buffer zone of space having no active devices surrounding sensor cell 12 so that stress and strain, which are generated in sensor cell 12, are not transmitted to other circuitry. If sensor cell 12 comprises an optical sensor, the means for isolation would comprise an opaque coating over the portions to be protected. Likewise, if sensor cell 12 comprised a Hall effect or magnetic field sensor, the means for isolation would comprise a low permitivity coating which would cover magnetic field sensitive components. The exact composition and placement of the means for isolation will, of course, be specific to the types of sensors incorporated in sensor cell 12. Position and placement of isolation means are well known in the art.

Control and driver circuit 17 is located between microprocessor core 19 and power output driver 9, further buffering the two circuits. This is a logical placement in that control and driver circuit 17 receives inputs from microprocessor core 19 and drives power output 9. Internal temperature sense circuit 18 for power output driver 9 is located next to power output driver 9. Optionally, another internal temperature sense circuit (not shown) could be incorporated near sensor cell 12 to more accurately monitor temperature on that portion of the chip. A deep guard ring 34 which acts to collect substrate currents surrounds power output driver 9. Deep guard ring 34 is connected to the $V_{SS2}$ bus and is made up of a P+ region diffused into a P− well, as described in more detail hereinafter. Deep guard ring 34 is effective for collecting the potentially large parasitic substrate currents because it extends farther down into substrate 40 than a P+ ring alone.

Figure 4:
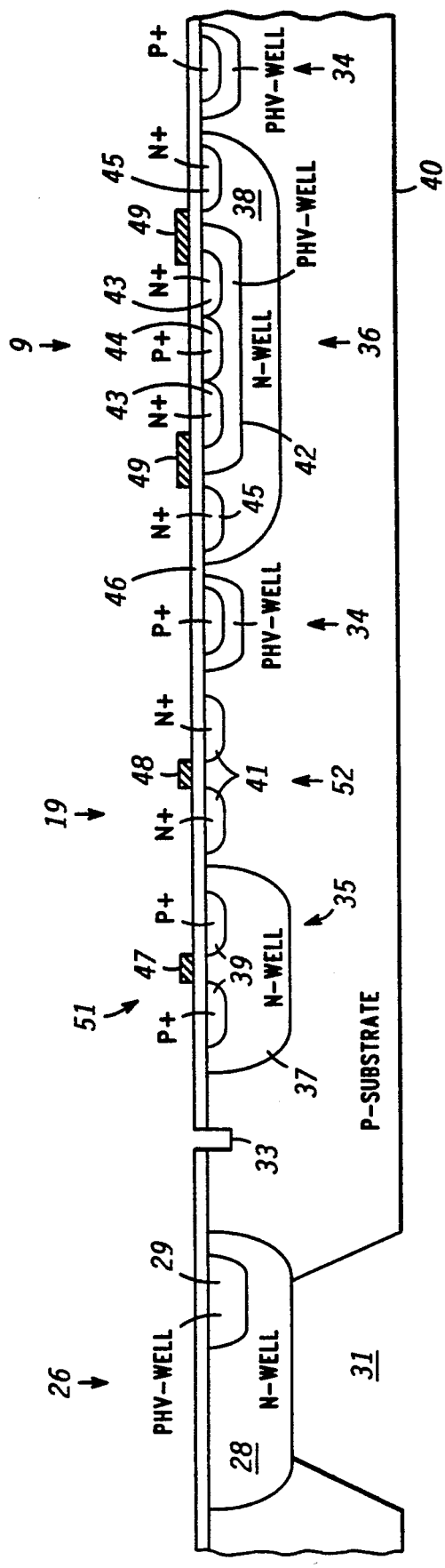
FIG. 4 illustrates a cross-sectional view of a portion of an integrated circuit of the present invention including a microprocessor core, high current drive device, and sensor devices.

FIG. 4 illustrates a cross-sectional view of the integrated circuit of the present invention. Sensor cell 26 is illustrated by a conventional pressure transducer, as a pressure transducer is one of the more difficult sensor structures to integrate with a microprocessor. It should be apparent that other environmental sensor structures may be incorporated in sensor cell 26 using the same diffused regions which are available for a pressure transducer and microprocessor 19 and power output driver 9. Microprocessor 19 can be formed with CMOS technology which is shown in the cross-section. Signal processing and conditioning, as well as sensor bias circuitry shown in FIG. 2, are not included in FIG. 4 as these elements can be formed using CMOS technology similar to that shown for microprocessor core 19.

Transistor structures of microprocessor core 19 and power output driver 9 are shown in cross-sectional view in FIG. 4 as devices 35 and 36, respectively. Devices 35 are typical of devices found in standard N-well CMOS process. Devices 36 use similar structural elements as devices 35 with the addition of a PHV-well 42 (high voltage P-well) being formed in an N-well 38 and thus forming a portion of power output driver 9. It is possible to build microprocessor 19 on the same substrate as power output driver 9 by masking devices 35 during implantation of PHV-well 42 so that PHV-wells 42 and 29 exist only in device 36 and sensor cell 26 respectively. Although an N-well process in a P-type substrate has been shown, it would be obvious to one of skill in the art that the complementary structure of P-wells in an N-type substrate is a viable alternate structure.

In devices 35, N-well 37 is first diffused into substrate 40. Simultaneously, N-well 38 in devices 36 is also diffused into substrate 40, with doping concentrations and profiles of N-wells 37 and 38 being equal and greater than doping concentration of substrate 40. PHV-well 42 is then formed in N-well 38 in device 36 and PHV-well 29 formed in N-well 28 in device 26. PHV-wells have a doping concentration which is greater than that of the N-well 38 and 28. P-type regions 39 and 44 are then formed in N-well 37 and PHV-well 42. N-type regions 41, 43, and 45 are simultaneously formed in substrate 40, PHV-well 42, and N-well 38. Doping concentrations of N-type regions 41, 43, and 45, and P-type regions 39 and 44 are all greater than doping concentration of PHV-well 42. Dielectric 46 is grown on the surface and gates 47, 48, and 49 are deposited using processes well known in the art. Dielectric 46 may comprise one or more layers of oxide, silicon nitride, or the like.

P-type regions 39 in combination with gate 47 form a P-type field effect transistor 51, and N-type regions 41 in combination with gate 48 form an N-type field effect transistor 52. These complementary field effect transistors 51 and 52 then form necessary building blocks of microprocessor core 19. A portion of power output driver 9 is depicted as an N-type lateral diffused MOS device wherein P-type region 44 provides an ohmic contact to PHV-well 42 in order to back bias a source of device 36. N-type region 43 forms a doughnut shaped region which surrounds P-type region 44. Similarly, N-type region 45 forms a doughnut shaped area which surrounds PHV-well 42. Gate 49 also forms a doughnut shaped region between N-type regions 43 and 45.

Device 36 is repeated to form an array in which all devices are then coupled in parallel to provide a power transistor. Guard rings 34, as shown in FIG. 3, surround device 36, or an array of devices 36, and is made up of a P-type region formed in a PHV well. As the number of devices 36 in an array increases, so does the channel width and power handling capability of power output driver 9.

Sensor cell 26 uses structural elements which are common to both microprocessor 19 and power output driver 9. Sensor cell 26 is illustrated as a pressure sensor because this is the most demanding sensor device to integrate with a microprocessor. Other environmental sensors can be built using similar structural elements as those illustrated in sensor cell 26. Most environmental sensors, including pressure sensors, optical sensors, magnetic field sensors, and some chemical sensors can be incorporated in sensor cell 26 using the structural elements shown.

Sensor cell 26 includes an N-well 28 formed in P-type substrate 40. N-well 28 can serve as an etch stop for electrochemical etching to produce cavity 31. Electrochemical etching relies on a semiconductor PN junction to stop an anisotropic silicon etch, such as potassium hydroxide, during formation of cavity 31. By taking advantage of electrochemical etching, cavity 31 can be formed late in processing or even as a last step before packaging. This "cavity last" ability greatly improves yield and adds great flexibility in combining sensor processes with microprocessors and power devices. N-well 28 thus forms a diaphragm which can flex when pressure is applied. PHV-well 29 is used to form a piezo-resistive element in sensor cell 26.

Sensor cell 26 is surrounded by a means for isolating 33 which protects microprocessor core 19 and power output driver 9 from an environmental condition which is sensed by sensor cell 26. As illustrated in FIG. 4, means for isolation 33 may comprise a buffer zone of space having no active devices or a groove formed in the surface of substrate 40. Isolation means 33 serves to prevent transmission of an external environmental condition to other active circuitry integrated with sensor cell 26. Isolation means 33 should be adapted to block transmission of the particular environmental condition or conditions to which sensor cell 26 is exposed, and therefore will have a composition and placement dictated by the particular sensitivities of sensor cell 26, as discussed hereinbefore.

By now it should be appreciated that many circuit and system advantages are realized by integrating a dedicated microprocessor core on the same substrate as that of an environmental sensor and a high current drive device. In larger systems, the main controlling microprocessor may be allowed to spend more time on other system functions since it will not be required to spend as much CPU time instructing and monitoring the integrated microprocessor-sensor device due to the processing capabilities of the microprocessor-sensor device. Additionally, the integrated microprocessor-sensor device is able to monitor the substrate temperature and hence the operating temperature of the sensor portion of the integrated circuit directly since they share the same substrate, allowing improved temperature compensation and device calibration. Due to minimal spacing between the microprocessor and sensor devices, communication between the devices is greatly improved. Also, digital rather than analog communication to and from the sensor device is possible.

We claim:

1. An integrated circuit comprising: a microprocessor core having an analog input terminal and an input/output terminal, wherein the microprocessor core produces a control output on the input/output terminal in response to a signal on the analog input terminal; and means for sensing an environmental condition external to the integrated circuit, wherein the means for sensing has an output coupled to the analog input terminal of the microprocessor core, and upon sensing an unacceptable external environmental condition, provides an analog output signal on the output coupled to the analog input terminal of the microprocessor core, and the microprocessor core and the means for sensing are isolated from each other and are formed as a monolithic integrated circuit.

2. The integrated circuit of claim 1 wherein the means for sensing comprises at least a micromachined electromechanical sensor.

3. The integrated circuit of claim 1 wherein the means for sensing comprises at least an optical sensor.

4. The integrated circuit of claim 1 wherein the means for sensing comprises at least an electromagnetic sensor.

5. The integrated circuit of claim 1 wherein the means for sensing comprises at least a chemical sensor.

6. The integrated circuit of claim 1 further comprising a power output device coupled to the microprocessor core for providing a current drive capability greater than that of the microprocessor itself.

7. An integrated circuit comprising: a microprocessor core having an analog input terminal and a digital input/output port, wherein the microprocessor core produces a control output on the digital input/output port in response to a signal on the analog input terminal; a sensor cell having an analog output terminal coupled to the analog input terminal of the microprocessor core, wherein the sensor cell provides an analog output signal upon sensing an unacceptable environmental condition; a control and driver circuit for generating a signal of greater magnitude than the microprocessor control output, wherein the control and driver circuit includes a first digital input/output port coupled to the digital input/output port of the microprocessor core for receiving the control output from the microprocessor core and a second digital input/output port for providing the signal of greater magnitude than the microprocessor control output, and a power output driver coupled to the digital input/output port of the microprocessor for sending status information to the microprocessor core and coupled to the second digital input/output port of the control and driver circuit for receiving the signal of greater magnitude than the microprocessor control output from the control and driver circuit; wherein the microprocessor core, the sensor cell, the control and driver circuit, and the power output driver are formed as a monolithic integrated circuit.

8. The integrated circuit of claim 7 further comprising at least one temperature sensor coupled to the analog input of the microprocessor core.

9. The integrated circuit of claim 7 wherein the sensor cell further comprises a digital input port coupled to the digital input/output port of the microprocessor core wherein the sensor digital input port regulates biasing of the sensor cell.

* * * * *